United States Patent
Zha et al.

(10) Patent No.: US 6,800,724 B2
(45) Date of Patent: Oct. 5, 2004

(54) MATERIALS FOR OPTICAL APPLICATIONS

(75) Inventors: Congji Zha, Holt (AU); Graham Atkins, Downer (AU)

(73) Assignees: The Australian National University, Acton (AU); The University of Sydney, Sydney (AU)

( * ) Notice: Subject to any disclaimer, the term of this patent is extended or adjusted under 35 U.S.C. 154(b) by 252 days.

(21) Appl. No.: 10/131,491

(22) Filed: Apr. 25, 2002

(65) Prior Publication Data

US 2002/0165339 A1 Nov. 7, 2002

Related U.S. Application Data

(60) Provisional application No. 60/286,522, filed on Apr. 27, 2001.
(51) Int. Cl.[7] .............................................. C08G 65/34
(52) U.S. Cl. ..................... 528/425; 528/10; 528/486; 528/481
(58) Field of Search ...................... 528/425, 10, 486, 528/489

(56) References Cited

FOREIGN PATENT DOCUMENTS

| | | |
|---|---|---|
| DE | 41 37 278 | 12/1992 |
| DE | 43 00 809 | 1/1995 |
| EP | 0 652 245 B1 | 8/2000 |
| EP | 0 978 525 | 10/2000 |
| JP | 63210839 | 9/1988 |
| JP | 1163277 | 6/1989 |
| JP | 4157402 | 5/1992 |
| JP | 6256519 | 9/1994 |
| JP | 7138371 | 5/1995 |
| JP | 7165921 | 6/1995 |
| JP | 7224169 | 8/1995 |
| JP | 8092374 | 4/1996 |
| JP | 11193329 | 7/1999 |
| JP | 11349815 | 12/1999 |
| WO | WO 97/17144 | 5/1997 |

*Primary Examiner*—Duc Truong
(74) *Attorney, Agent, or Firm*—Stites & Harbison PLLC; B. Aaron Schulman

(57) ABSTRACT

The present invention relates generally to a method of synthesising a metal alkoxide polymer involving the following general steps: 1. acidolysis; 2. condensation; and 3. subsequent processing. The acidolysis step is preferably performed without addition of water, in the presence of a mutual solvent. The acidolysis step involves acidolysis of a metal alkoxide compound with an acid to produce an intermediate acidolysed solution. The condensation step involves condensation of the intermediate solution in the presence of a metal alkoxide compound to produce the metal alkoxide polymer.

40 Claims, No Drawings

MATERIALS FOR OPTICAL APPLICATIONS

CROSS REFERENCE TO RELATED APPLICATIONS

The present application claims the benefit of U.S. provisional application Ser. No. 60/286,522, filed Apr. 27, 2001.

FIELD OF THE INVENTION

The present invention relates generally to a method of synthesising metal alkoxide polymers and relates particularly, though not exclusively, to a method for synthesising hybrid organic/inorganic materials with low optical absorption for optical applications. The invention further relates to the use of these materials for the production of optical waveguides that are used, inter alia, in photonic components for telecommunications networks.

BACKGROUND TO THE INVENTION

Hybrid organic/inorganic materials, in particular siloxane polymers, are excellent candidates for optical materials, in particular for waveguide applications. These hybrid materials share many of the benefits of polymers including rapid material deposition, low processing temperature and amenability to photolithographic waveguide definition, while the silicate backbone increases the hardness and dilutes the hydrocarbon content. This dilution of the hydrocarbon content is important because overtones from C—H vibrations cause optical absorption around the 1.3 and 1.55 $\mu$m communications bands.

One potential problem with siloxane polymers is O—H bonds, which also have overtone absorptions around the communications bands and particularly affect the 1.55 $\mu$m band. O—H bonds are a particular problem if the siloxane polymers are produced by the known sol-gel process, and the condensation stage is incomplete. In general, the sol-gel process consists of two stages, namely hydrolysis followed by condensation. Water is used to hydrolyse one or more metal alkoxides to produce M-OH groups that condense to form M-O-M linkages, thereby building up a metal oxide network. For example, the liquid methyl triethoxysilane can according to the sol-gel process be hydrolysed:

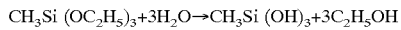

And condensed to produce a methyl-substituted silicate:

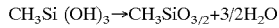

The CH$_3$-alkyl substituent is unaffected by the hydrolysis and condensation stages. It will be appreciated that as condensation proceeds, the silicate network becomes increasingly entangled, thereby hindering further condensation reactions, resulting in residual SiOH groups that cause absorption. It is also difficult to completely remove the water from the final product, resulting in additional O—H absorption. These problems have resulted in the development of siloxane polymers for optical waveguide applications with various methods for minimising the O—H content. In one example in an aqueous sol-gel system the O—H content is reduced by incorporating a fluorosilane component and using processing methods that encourage condensation. In another example, a non-aqueous method is used to directly condense silanol and alkoxysilane species and since this method does not involve a hydrolysis stage it is not strictly a sol-gel process.

SUMMARY OF THE INVENTION

According to one aspect of the invention there is provided a method of synthesising a metal alkoxide polymer, the method involving the steps of:

acidolysis of a metal alkoxide compound with an acid to produce an intermediate acidolysed solution; and condensation of the intermediate solution in the presence of a metal alkoxide compound to produce the metal alkoxide polymer.

Generally the metal alkoxide compounds used in the respective acidolysis and condensation steps are different. Alternatively, said metal alkoxides are the same.

Preferably the acidolysis and condensation steps are performed without addition of water. It is to be understood that acid is consumed in the acidolysis reaction of the present invention unlike in the prior art where acid(s) are used to catalyse, and are not consumed in, aqueous hydrolysis reactions.

Preferably the metal alkoxide compounds are organically modified. More preferably at least 25% of the metal alkoxide compounds used in the acidolysis and/or condensation steps are organically modified.

It is to be understood that for the purpose of this specification, an organically modified metal alkoxide compound includes at least one metal to carbon bond that is unaffected during acidolysis and condensation steps.

According to another aspect of the invention there is provided a metal alkoxide polymer being synthesised from acidolysis of a metal alkoxide compound to produce an intermediate acidolysed solution and thereafter condensation of the intermediate acidolysed solution in the presence of another metal alkoxide compound to produce the metal alkoxide polymer.

According to a further aspect of the invention there is provided a metal alkoxide polymer of an optical component, the polymer having a relatively low concentration of hydroxy groups.

Preferably the relatively low concentration of hydroxy groups is less than about 1400 ppm by weight.

Preferably the relatively low concentration of hydroxy groups is reflected in an infra-red (IR) absorption of less than about 140 dB/cm at an MO-H peak near 2760 nm, where M is a metal.

According to yet another aspect of the invention there is provided a method of forming an optical component including a metal alkoxide polymer, said method involving synthesis of the metal alkoxide polymer by acidolysis and condensation of a metal alkoxide compound.

Preferably the acidolysis and condensation step is performed without addition of water.

According to yet a further aspect of the invention there is provided an optical component including a metal alkoxide polymer being synthesised by the acidolysis and condensation of a metal alkoxide compound.

Preferably the optical component is a planar waveguide, optical fibre, integrated device or micro-optic device.

Preferably the metal alkoxide compound(s) have the general formula $R^1_n M(OR)_{V-n}$, where: M is a metal of valence V, n is an integer from 0 to (V−1); R is a short chain alkyl group with 1 to 6 carbon atoms; and $R^1$ is an alkyl or aryl group containing from 1 to 20 carbon atoms. The alkyl or aryl group $R^1$ may have substituents including species such as alkenyl, allyl, alkacryloxy, acryloxy, epoxy groups, which can be polymerised either photolytically or thermally to form an organic network, as well as halogen, amino, mercapto, cyano, nitro, amido and hydroxy groups.

If more than one $R^1$ group is present, the $R^1$ groups may or may not be identical. Preferably at least one of the metal alkoxide compounds should have n greater than zero, that is have at least one M-C bond, and said compounds should make up at least 25% of the total number of metal alkoxide species.

Preferably the metal alkoxide compound(s) are alkoxides of silicon, zirconium, titanium, germanium and/or aluminium.

Preferably the acid is an inorganic acid such as boric or phosphoric acid or a carboxylic acid such as formic, acetic or oxalic acid. More preferably the acid is of an element that has a glass forming or glass modifying oxide, and has a pKa greater than about 2.

Preferably the molar ratio of the acid to the metal alkoxide compound in the acidolysis step is from 1:5 to 10:1.

Preferably the acidolysis of the metal alkoxide compound is performed in the presence of a mutual solvent. More preferably the mutual solvent is an alcohol such as methanol.

Preferably the acidolysis and/or condensations steps are each conducted for at least 10 minutes at a temperature of between 0° C. and the boiling point of the mutual solvent. More preferably each of said steps is carried out at room temperature for 1 to 24 hours.

Preferably the molar ratio of the metal alkoxide compound in the acidolysis step to the metal alkoxide compound in the condensation step is from 1:10 to 10:1. More preferably said molar ratio is about 1:1.

The acidolysis and condensation steps may be performed repeatedly.

Preferably the metal alkoxide polymer is a resin.

DETAILED DESCRIPTION OF THE PREFERRED EMBODIMENTS

In order to achieve a better understanding of the nature of the invention, preferred embodiments of the method of synthesising a metal alkoxide polymer will now be described in some detail with reference to various illustrative examples.

The described embodiments of the method involve the following general steps although it should be appreciated that the step of subsequent processing may be omitted or varied depending on the application:

(i) acidolysis step;
(ii) condensation step; and
(iii) subsequent processing.

Acidolysis Step

This step is preferably performed without addition of water, in the presence of a mutual solvent that can be readily removed by evaporation, such as methanol or acetone.

The first metal alkoxide compounds used in this step typically have the general formula $R^1{}_nM(OR)_{V-n}$, where: M is a metal of valence V, preferably silicon, zirconium, titanium, germanium and aluminium, n is an integer from 0 to (V-1); R is a short chain alkyl group with 1 to 6 carbon atoms; and $R^1$ is an alkyl or aryl group with optional substituents and containing from 1 to 20 carbon atoms. The optional substituents include species such as alkenyl, allyl, alkacryloxy, acryloxy, epoxy groups, which can be polymerised either photolytically or thermally to form an organic network, as well as halogen, amino, mercapto, cyano, nitro, amido and hydroxy groups. If more than one $R^1$ group is present, they may or may not be identical. Unsubstituted alkyl or aryl groups, such as methyl and phenyl groups, are useful for adjusting the refractive index of the material. Preferably, at least 25% of the total number of metal alkoxide species should have n greater than zero.

The acid is generally a weak acid and may be selected from a range of inorganic acids (e.g. boric or phosphoric acid) or carboxylic acids (e.g. formic, acetic or oxalic acid), and preferably the acid has a $pK_a > 2$. Inorganic acids are preferred if an alcohol is used as the solvent for this step, since carboxylic acids undergo esterification reactions with alcohols, with concomitant production of water. Inorganic acids of elements that form oxides that are glass formers or glass modifiers (e.g. $B_2O_3$ and $P_2O_5$) are further preferred because they can be at least partly incorporated into the hybrid organic/inorganic product material, diluting the organic content and thereby increasing its hardness and decreasing the C—H overtone absorption. Boric acid is particularly preferred since at the end of the acidolysis step, boron-containing species that have not become incorporated into the material (e.g. boric acid and boron alkoxides) are readily removed along with solvent during evaporation.

The molar ratio of acid to metal alkoxide species is preferably between 1:5 and 10:1. By way of example, the acidolysis of a first metal alkoxide compound with boric acid can be represented as:

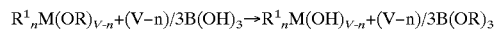

After the first metal alkoxide and weak acid species for this embodiment have been dissolved in the mutual solvent, the mixture is allowed to react for at least 10 minutes, at a temperature between 0° C. and the boiling point of the solvent. Preferably, the reaction is carried out at room temperature for 1 to 24 hours. The solvent and any volatile products or excess acid may be removed by evaporation under reduced pressure at the completion of this step, to leave a viscous liquid or glassy solid.

Condensation Step

If the solvent is removed at the end of the acidolysis step, then the glassy solid or viscous liquid is preferably dissolved/diluted in a mutual solvent such as methanol or acetone. One or more second metal alkoxide compounds, of the same general formula $R^1{}_nM(OR)_{V-n}$ as described above for the acidolysis step, are then added to the solution and preferably the mixture allowed to react for at least 10 minutes, at a temperature between 0° C. and the boiling point of the solvent. This condensation step is preferably performed without addition of water. The solvent and volatile reaction products are then removed by evaporation under reduced pressure, to leave a viscous liquid that is the metal alkoxide polymer product material. The molar ratio of the silicon alkoxide species added in this step to those added in the acidolysis step is typically from 1:10 to 10:1, preferably approximately 1:1. Preferably, at least 25% of the total number of metal alkoxide species added in this step should have n greater than zero. By way of example, the condensation reaction between an acidolysed first metal alkoxide and a second metal alkoxide can be represented as:

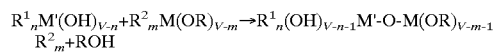

It should be understood that synthetic procedures involving repeated applications of the acidolysis and condensation steps or using more than one type of metal alkoxide compound in the acidolysis and/or condensation steps are also covered by the present invention.

Optionally, a small amount of a condensation catalyst can be added before the solvent is evaporated off, to encourage the 2≡MOH→≡M-O-M≡+H$_2$O condensation reaction, thereby reducing the OH-related absorption of the product polymers. Many such condensation catalysts, especially for siloxane polymers, will be known to those skilled in the art.

Subsequent Processing

In applications of the invention requiring the deposition of optical quality films (e.g. by spin coating or dip coating), the metal alkoxide polymers can be diluted to the required viscosity with a low volatility solvent and then filtered to remove particulate matter. Such deposition and filtration techniques and solvents (e.g. propyl acetate, propylene glycol methyl ether acetate and cyclohexanone) are known to those skilled in the art. The metal alkoxide polymers produced according to this embodiment of the present invention have exceptional film forming capability with the spin coating technique, and display excellent adhesion to many substrates including fused silica, silicon and oxidised silicon. Films up to 15 μm thick, sufficient for the cladding and core layers of single mode optical waveguides, can be deposited in a single step. After deposition, the films are able to withstand extended periods of baking at temperatures up to 200° C. without cracking or loss of adhesion. After baking, the films have unexpectedly low optical loss owing to their extremely low OH content, and show excellent chemical resistance.

If metal alkoxide compounds with photopolymerisable substituents are employed in this embodiment of the invention, it is advantageous to add a photoinitiator to the metal alkoxide polymer prior to filtration and film deposition. Preferably, the photoinitiator is dissolved in the solvent used to dilute the metal alkoxide polymer to the desired viscosity. One suitable photoinitiator is 2,2-dimethoxy-2-phenylacetophenone (BDK), but several other suitable photoinitiators will be known to those skilled in the art, depending on the application and the available light source. The photoinitiator is typically included in amounts less than 10 mole % with respect to the photopolymerisable substituent, and preferably less than 5 mole %. It is also preferred that any solvent evaporation steps be performed under reduced pressure, at as low a temperature as possible, to limit any thermally-induced polymerisation of the substituents.

EXAMPLE 1

Protective Coating Material 0.022 mol boric acid and 0.022 mol phenyl triethoxysilane (PhTES) are dissolved in 6.3 g methanol and stirred at room temperature for 20 hours. 0.022 mol vinyl trimethoxysilane (VTMS) is then added and the mixture refluxed for one hour. Volatiles are removed by vacuum evaporation at 90° C. to leave a clear, viscous resin. In this example the PhTES is the first metal alkoxide compound and the VTMS the second metal alkoxide compound, and vacuum evaporation after the first step (acidolysis of PhTES) is not required to obtain a low SiOH product. The optical absorption of this material at 2760 nm (the peak of the SiO—H fundamental stretching vibration) is 80 dB/cm, corresponding to an approximate OH concentration of 800 ppm by weight.

In preparation for spin coating, the resin is diluted with cyclohexanone (1 g cyclohexanone to 4 g resin) then passed through a 0.2 μm PTFE filter. Films are spin coated at 4000 rpm for 40 seconds and baked for 12 hours at 200° C. The resulting films have a refractive index of 1.520 at 633 nm and 1.516 at 810 nm. Because of the exceptional hardness and abrasion resistance exhibited by films of this composition, it is ideally suited to protective coatings for optical waveguides (useful in the process of 'packaging' optical components).

Comparative Example 1

0.022 mol boric acid, 0.022 mol phenyl triethoxysilane (PhTES) and 0.022 mol vinyl trimethoxysilane (VTMS) are dissolved in 6.3 g methanol and stirred at room temperature for 20 hours. The mixture is then refluxed for one hour, and volatiles removed by vacuum evaporation at 90° C. to leave a clear, viscous resin. The optical absorption of this material, produced by a one step process, is 1100 dB/cm at 2760 nm, corresponding to an approximate OH concentration of 11000 ppm by weight, fourteen times higher than for the corresponding material produced by Example 1 of the inventive two step process.

EXAMPLE 2

UV Curable Cladding Material 0.046 mol boric acid and 0.071 mol dimethyldimethoxysilane (DMDMS) are dissolved in 13.5 g methanol and stirred at room temperature for 20 hours, then volatiles are removed by vacuum evaporation at 80° C. to leave a glass solid being the intermediate acidolysed solution. The solid is dissolved in 20 g acetone, 0.046 mol 3-(trimethoxysilyl) propyl methacrylate (MPS) is added and the mixture refluxed for one hour. Volatiles are removed by vacuum evaporation at 90° C. to leave a clear, viscous (liquid) resin. In this example the DMDMS and MPS are the first and second metal alkoxide compounds respectively. The optical absorption of this material is 110 dB/cm at 2760 nm, corresponding to an approximate OH concentration of 1110 ppm by weight.

In preparation for spin coating, the resin is diluted with cyclohexanone (1 g cyclohexanone to 4 g resin) containing 0.0023 mol of the photo-initiator BDK, then passed through a 0.2 μm PTFE filter. Films are spin coated at 4000 rpm for 40 seconds and pre-baked for 1 minute on an 80° C. hotplate. The material is UV cured with a flood exposure (12 mW/cm$^2$, 1 minute) under a mercury lamp mask aligner, and post-baked for 1 hour at 170° C. Material prepared according to this example has a refractive index of 1.474 at 633 nm and 1.470 at 810 nm.

Comparative Example 2

0.046 mol boric acid, 0.071 mol dimethyldimethoxysilane (DMDMS) and 0.046 mol 3-(trimethoxysilyl) propyl methacrylate (MPS) are dissolved in 13.5 g methanol and stirred at room temperature for 20 hours. The mixture is then refluxed for one hour, and volatiles removed by vacuum evaporation at 90° C. to leave a clear, viscous (liquid) resin. The optical absorption of this material, produced by a one step process, is 2300 dB/cm at 2760 nm, corresponding to an approximate OH concentration of 23000 ppm by weight, twenty one times higher than for the corresponding material produced by Example 2 of the inventive two step process.

EXAMPLE 3

UV Curable Core Material 0.081 mol boric acid and 0.081 mol 3-(trimethoxysilyl) propyl methacrylate (MPS) are dissolved in 31.6 g methanol and stirred at room temperature for 16 hours, then volatiles are removed by vacuum evaporation at 80° C. to leave a viscous resin, the intermediate acidolysed solution. The resin is diluted with 31.6 g methanol, then 0.081 mol phenyl triethoxysilane (PhTES) is added and the mixture refluxed for 3 hours, then stirred at room temperature for 16 hours. Finally, volatiles are removed by vacuum evaporation at 80° C. to leave a slightly yellow viscous resin. In this example the MPS and PhTES are the first and second metal alkoxide compounds respectively. The optical absorption of this material is 100 dB/cm at 2760 nm, corresponding to an approximate OH concentration of 1000 ppm by weight.

In preparation for spin coating, the resin is diluted with cyclohexanone (1 g cyclohexanone to 4 g resin) containing 0.0041 mol of the photo-initiator BDK, then passed through a 0.2 $\mu$m PTFE filter. Films are spin coated at 4000 rpm for 40 seconds and pre-baked for 1 minute on an 80° C. hotplate. Waveguides are imprinted using a laser direct write system (HeCd laser, 325 nm) with a 15 $\mu$W beam focused to a 5 $\mu$m diameter spot and scanned at 0.4 mm/s, and then developed (i.e. the unexposed material dissolved) with propyl acetate. The resulting 6 $\mu$m wide waveguides are then post-baked for 1 hour at 170° C. Material prepared according to this example has a refractive index of 1.517 at 633 nm and 1.512 at 810 nm. Because this material has a higher refractive index than the material of example 2, they can be used as the core and cladding materials respectively for optical waveguides.

Comparative Example 3a 0.081 mol boric acid, 0.081 mol 3-(trimethoxysilyl) propyl methacrylate (MPS) and 0.081 mol phenyl triethoxysilane (PhTES) are dissolved in 31.6 g methanol and stirred at room temperature for 16 hours. The mixture is then refluxed for 3 hours, and volatiles removed by vacuum evaporation at 80° C. to leave a slightly yellow viscous resin. The optical absorption of this material, produced by a one step process, is 1800 dB/cm at 2760 nm, corresponding to an approximate OH concentration of 18000 ppm by weight, eighteen times higher than for the corresponding material produced by Example 3 of the inventive two step process.

Comparative Example 3b

UV Curable Core Material 1 mol diphenylsilanediol, 1 mol 3-(trimethoxysilyl) propyl methacrylate (MPS) and 0.4 g barium hydroxide monohydrate are combined and refluxed at 80° C. A clear solution is obtained after 4 minutes, and the reaction is complete after 15 minutes. Volatiles are removed by vacuum evaporation at 90° C. to leave a slightly yellow viscous resin. The optical absorption of this material is 140 dB/cm at 2760 nm, corresponding to an approximate OH concentration of 1400 ppm by weight, 1.4 times higher than for Example 3 of the inventive UV curable core material.

EXAMPLE 4

Alternative UV Curable Core Material 0.081 mol boric acid and 0.081 mol 3-(trimethyoxysilyl) propyl methacrylate (MPS) are dissolved in 31.6 g methanol and stirred at room temperature for 12 hours, then volatiles are removed by vacuum evaporation at 80° C. to leave a viscous resin, the intermediate acidolysed solution. The resin is diluted with 31.6 g methanol, then 0.020 mol zirconium propoxide is added and the mixture refluxed for 1 hour. Finally, volatiles are removed by vacuum evaporation at 80° C. to leave a viscous resin. In this example the MPS and zirconium propoxide are the first and second metal alkoxide compounds respectively. Material prepared according to this example has a refractive index of 1.509 at 633 nm and 1.503 at 810 nm.

EXAMPLE 5

Oxidation Protection Coating 0.18 mol formic acid is added dropwise to a solution of 0.045 mol tetraethyl orthosilicate (TEOS) in 0.32 mol dichloromethane, and the mixture stirred at room temperature for 24 hours. Volatiles are removed by vacuum evaporation at room temperature to leave a viscous resin, the intermediate acidolysed solution. The resin is diluted with 15.8 g ethanol, then 0.0075 mol aluminium ethoxide is added and the mixture refluxed for 24 hours. In this example the TEOS and aluminium ethoxide are the first and second metal alkoxide compounds respectively. This material, with no organic modification on the metal atoms, was developed for oxidation protection coatings.

In these examples the phenyl substituents introduced via the PhTES serve to increase the refractive index of the material above that of silica, to enable waveguiding, while the methacryl substituents introduced via the MPS confer UV sensitivity. The boric acid serves to initiate the reaction by acidolysing the first metal alkoxide compound(s), and most of the boric acid is removed in the first vacuum evaporation. Some of the boric acid is incorporated into the silicate network, presumably as =Si—O—B linkages. This feature of the boric acid is believed to be related to the superior hardness and toughness of the Example 1 material compared with most other hybrid organic/inorganic silicate materials.

The metal alkoxide polymers described above can be used to make optical waveguides for photonic components for telecommunications networks. Such optical waveguides are preferably made by depositing at least one layer (the core), or preferably three layers of the metal alkoxide polymers. As will be known to those skilled in the art, the middle layer, known as the core layer, has a higher refractive index than the other layers, known as the cladding layers. The two cladding layers need not have the same composition, but preferably they should have the same refractive index as each other so that the waveguiding structure, and hence the guided optical mode, is symmetric. Preferably the three layers are supported on a planar substrate, such as a silicon wafer (which may or may not have a surface layer of silicon dioxide) or a rigid polymer. In an alternative embodiment, a silicon dioxide layer can serve as one of the cladding layers.

Preferably, each of the three layers is deposited by spin coating, although other techniques such as dip coating are possible.

Preferably, the core layer material is sensitive to energetic radiation so that waveguides can be patterned into it. More preferably, the core layer material is sensitive to ultraviolet (UV light, so that the waveguide patterning can be performed with a spatially selective source of UV light such as a mask aligner or a UV laser direct write system. More preferably, the core layer material contains unsaturated carbon-carbon bonds that can be cross-linked by means of a UV-sensitive photoinitiator added to the metal alkoxide polymer used to form the core layer material. More preferably, the cross-linked material has a much lower solubility than the un-cross-linked material, so that the waveguides can be "developed" by dissolving the un-cross-linked material with a solvent.

Preferably, the cladding layer material is similarly sensitive to energetic radiation, so that its hardness can be increased by exposure to said energetic radiation.

By integrating said waveguides with components such as electrodes for heating or applying an electric field, and/or by design of said waveguides, photonic devices wherein light guided in the waveguides is switched, modulated, or otherwise affected in a controlled fashion, can be fabricated. These photonic devices may be useful in photonic communications networks.

Numerous variations and modifications to the described method and resultant metal alkoxide polymers will suggest themselves to persons skilled in the art in addition to those described. For example, the refractive index of the metal alkoxide polymers can be adjusted by varying the ratio of VTMS and/or MPS to PhTES and/or dimethyl dimethoxysilane (DMDMS). The optical properties of the polymer product may also be adjusted by partially replacing PhTES with methyl trimethoxysilane (MTES) or DMDMS or by using alkoxides of other metals, such as zirconium, titanium, germanium or aluminium. The described embodiments of the invention provide a method to synthesise materials with a wide range of compositions, hardness, low optical absorption and low shrinkage. In addition to the applications described in the Examples above, the metal alkoxide polymers can be used for moulding micro-optic components (e.g. lenses) or as an optical glue or an encapsulent for device packaging, for a range of optical applications including but not limited to photonics.

All such variations and modifications are to be considered within the scope of the present invention, the nature of which is to be determined from the foregoing description.

What is claimed is:

1. A method of synthesising a metal alkoxide polymer, the method involving the steps of:
   acidolysis of a metal alkoxide compound with an acid to produce an intermediate acidolysed solution; and
   condensation of the intermediate acidolysed solution in the presence of a metal alkoxide compound to produce the metal alkoxide polymer.

2. A method of synthesising a metal alkoxide polymer as defined in claim 1 wherein the acidolysis and condensation steps are performed without addition of water.

3. A method of synthesising a metal alkoxide polymer as defined in claim 1 wherein the metal alkoxide compounds are organically modified.

4. A method of synthesising a metal alkoxide polymer as defined in claim 3 wherein at least 25% of the metal alkoxide compounds used in the acidolysis and/or condensation steps are organically modified.

5. A method of synthesising a metal alkoxide polymer as defined in claim 1 wherein the metal alkoxide compounds have the general formula $R^1{}_n M(OR)_{V-n}$, where: M is a metal of valence V, n is an integer from 0 to (V−1); R is a short chain alkyl group with 1 to 6 carbon atoms; and $R^1$ is an alkyl or aryl group containing from 1 to 20 carbon atoms.

6. A method of synthesising a metal alkoxide polymer as defined in claim 5 wherein the alkyl or aryl group $R^1$ has substituents including species such as alkenyl, allyl alkacryloxy, acryloxy, epoxy groups, which can be polymerised either photolytically or thermally to form an organic network, as well as halogen, amino, mercapto, cyano, nitro, amido and hydroxy groups.

7. A method of synthesising a metal alkoxide polymer as defined in claim 1 wherein the metal alkoxide compounds are alkoxides of silicon, zirconium, titanium, germanium and/or aluminium.

8. A method of synthesising a metal alkoxide polymer as defined in claim 1 wherein the acid is an inorganic acid such as boric or phosphoric acid or a carboxylic acid such as formic, acetic or oxalic acid.

9. A method of synthesising a metal alkoxide polymer as defined in claim 8 wherein the acid is of an element that has a glass forming or glass modifying oxide, and has a pKa greater than 2.

10. A method of synthesising a metal alkoxide polymer as defined in claim 1 wherein the molar ratio of the acid to the metal alkoxide compound in the acidolysis step is from 1:5 to 10:1.

11. A method of synthesising a metal alkoxide polymer as defined in claim 1 wherein the acidolysis of the metal alkoxide compound is performed in the presence of a mutual solvent.

12. A method of synthesising a metal alkoxide polymer as defined in claim 11 wherein the acidolysis and/or condensation steps are each conducted for at least 10 minutes at a temperature of between 0° C. and the boiling point of the mutual solvent.

13. A method of synthesising a metal alkoxide polymer as defined in claim 12 wherein each of said steps is carried out at room temperature for 1 to 24 hours.

14. A method of synthesising a metal alkoxide polymer as defined in claim 1 wherein the molar ratio of the metal alkoxide compound in the acidolysis step to the other metal alkoxide compound in the condensation step is from 1:10 to 10:1.

15. A method of synthesising a metal alkoxide polymer as defined in claim 14 wherein said molar ratio is about 1:1.

16. A method of synthesising a metal alkoxide polymer as defined in claim 1 wherein the acidolysis and condensations steps are performed repeatedly.

17. A method of synthesising a metal alkoxide polymer as defined in claim 1 wherein the method includes forming an optical component having the metal alkoxide polymer.

18. A metal alkoxide polymer being synthesised from acidolysis of a metal alkoxide compound to produce an intermediate acidolysed solution and thereafter condensation of the intermediate acidolysed solution in the presence of a metal alkoxide compound to produce the metal alkoxide polymer.

19. A metal alkoxide polymer as defined in claim 18 wherein the acidolysis and condensation steps are performed without addition of water.

20. A metal alkoxide polymer as defined in claim 18 wherein the metal alkoxide compounds have the general formula $R^1{}_n M(OR)_{V-n}$, where: M is a metal of valence V, n is an integer from 0 to (V−1); R is a short chain alkyl group with 1 to 6 carbon atoms; and $R^1$ is an alkyl or aryl group containing from 1 to 20 carbon atoms.

21. A metal alkoxide polymer as defined in claim 20 wherein the alkyl or aryl group $R^1$ has substituents including species such as alkenyl, allyl, alkacryloxy, acryloxy, epoxy groups, which can be polymerised either photolytically or thermally to form an organic network, as well as halogen, amino, mercapto, cyano, nitro, amido and hydroxy groups.

22. A metal alkoxide polymer as defined in claim 18 wherein the metal alkoxide compound is an alkoxide of silicon, zirconium, titanium, germanium and/or aluminium.

23. A metal alkoxide polymer as defined in claim 18 wherein said polymer is included in an optical component.

24. A metal alkoxide polymer of an optical component, said polymer having a relatively low concentration of hydroxy groups.

25. A metal alkoxide polymer as defined in claim 24 wherein the relatively low concentration of hydroxy groups is less than 1400 ppm by weight.

26. A metal alkoxide polymer as defined in claim 24 wherein the relatively low concentration of hydroxy groups is reflected in an infra-red (IR) absorption of less than 140 dB/cm at a MO—H absorption peak near 2760, where M is a metal.

27. A method of forming an optical component including a metal alkoxide polymer, said method involving synthesis of the metal alkoxide polymer by acidolysis and condensation of one or more metal alkoxide compounds.

28. A method of forming an optical component including a metal alkoxide polymer as defined in claim 27 wherein the acidolysis and condensation step is performed without addition of water.

29. A method of forming an optical component as defined in claim 27 wherein the metal alkoxide compounds are organically modified.

30. A method of forming an optical component as defined in claim 29 wherein at least 25% of the metal alkoxide compounds used in the acidolysis and condensation step are organically modified.

31. A method of forming an optical component as defined in claim 27 wherein the metal alkoxide compounds have the general formula $R^1_n M(OR)_{V-n}$, where: M is a metal of valence V, n is an integer from 0 to (V−1); R is a short chain alkyl group with 1 to 6 carbon atoms; and $R^1$ is an alkyl or aryl group containing from 1 to 20 carbon atoms.

32. A method of forming an optical component as defined in claim 31 wherein the alkyl or aryl group $R^1$ has substituents including species such as aklenyl, allyl, alkacryloxy, acryloxy, epoxy groups, which can be polymerised either photolytically or thermally to form an organic network, as well as halogen, amino, mercapto, cyano, nitro, amido and hydroxy groups.

33. A method of forming an optical component as defined in claim 27 wherein the metal alkoxide compounds are alkoxides of silicon, zirconium, titanium, germanium and/or aluminium.

34. A method of forming an optical component as defined in claim 27 wherein the acidolysis of the metal alkoxide compounds is performed in the presence of a mutual solvent.

35. An optical component including a metal alkoxide polymer being synthesised by the acidolysis and condensation of one or more metal alkoxide compounds.

36. An optical component as defined in claim 35 wherein the acidolysis and condensation step is performed without addition of water.

37. An optical component as defined in claim 35 which is a planar waveguide, optical fibre, integrated device or micro-optic device.

38. An optical component as defined in claim 35 wherein the metal alkoxide compounds have the general formula $R^1_n M(OR)_{V-n}$, where: M is a metal of valence V, n is an integer from 0 to (V−1); R is a short chain alkyl group with 1 to 6 carbon atoms; and $R^1$ is an alkyl or aryl group containing from 1 to 20 carbon atoms.

39. An optical component as defined in claim 38 wherein the alkyl or aryl group $R^1$ has substituents including species such as alkenyl, allyl, alkacryloxy, acryloxy, epoxy groups, which can be polymerised either photolytically or thermally to form an organic network, as well as halogen, amino, mercapto, cyano, nitro, amido and hydroxy groups.

40. An optical component as defined in claim 35 wherein the metal alkoxide compounds are alkoxides of silicon, zirconium, titanium, germanium and/or aluminium.

\* \* \* \* \*